UNITED STATES PATENT OFFICE.

ISAAC W. HEYSINGER, OF PHILADELPHIA, PENNSYLVANIA.

MANUFACTURE OF CANDIES, CAKES, &c.

SPECIFICATION forming part of Letters Patent No. 238,587, dated March 8, 1881.

Application filed February 7, 1881. (No specimens.)

*To all whom it may concern:*

Be it known that I, ISAAC W. HEYSINGER, of Philadelphia, county of Philadelphia, State of Pennsylvania, have invented a new and useful Improvement in the Manufacture of Candies and other Confectionery and Cakes, of which the following is a full, clear, and exact description, so as to enable those skilled in the art to manufacture the same.

My invention relates to the composition of a candy or a cake in which malt in a pulverized or partly-comminuted state, or in the form of a fluid or semi-fluid extract of the same, is used as one of the constituents thereof.

It is well known that malt consists of germinated grain, preferably barley or rye, in which the germination has been arrested by heat at a certain stage thereof, whereby the starchy elements are partly converted into grape-sugar by the action of a newly-formed substance known as "diastase," which is produced in the process of germination from the gluten and other elements of the grain. This diastase is a remarkable body, and is often called "vegetable pepsin," from its peculiar action upon starchy and saccharine substances, which, in the presence of moisture and at the temperature of the human body, it will rapidly convert into grape-sugar, the only form in which these substances are capable of being assimilated by the human organism. In addition to this, diastase is a valuable nutritive substance itself, being rich in nitrogenous elements, and it is itself split up in the processes of digestion, and goes to further nourish the body, having, also, a valuable medicinal effect in the regulation of the bowels and digestive organs. Then, besides, the husk and other indigestible portions of the malt, when it is used in the solid form, act as a stimulus to the peristaltic action of the stomach and intestines, thereby causing an increased influx of gastric and other digestive juices, as the experiments upon the man St. Martin clearly showed that mere watery infusions of sugar would not cause an outpour of gastric fluid unless supplemented by some solid substance.

Candy as ordinarily manufactured consists of cane-sugar, whatever other substancees are added, except such as are used for flavoring, being of the nature of adulterants, such as *terra alba*, glucose, &c. Instead of these I propose to use, in combination with cane-sugar, malt in the pulverized state, so as to increase the bulk, reduce the cost, and at the same time supply an element of the greatest value, especially to the digestive organs of children, where the habitual use of candy causes, in many cases, slow digestion, acetous fermentation, and a tendency to the development of worms and other parasites in the intestines.

For higher grades of candies I use the sirupy malt extract, which may be worked up cold with granulated sugar, the whole being afterward rolled out into sheets and formed into wafers, lozenges, and other flat or small candies in the usual way—that is, without the aid of heat—whereby the cane-sugar remains in its crystalline form and the malt extract acts as a cement, just as gum-arabic, &c., are ordinarily employed to do.

When the pulverized malt is used I prefer first dissolving it in a portion of the sugar, the whole being then incorporated with the balance of the material, though any of the methods of manufacture ordinarily resorted to may be employed, provided fermentation of the wet product be provided against.

With this candy I combine any flavoring substances desired, such as vanilla, chocolate, lemon, hoarhound, hops, &c., such as are in ordinary use.

For the manufacture of cakes I use a similar process, the malt being added either in the solid or liquid form, and afterward worked up, molded into shape, and quickly baked.

Having now described my invention, I desire to claim the following:

1. A candy or other confection composed of malt and cane-sugar with or without the addition of other substances, substantially as described.

2. The combination, in a confection or cake, of a substance rich in diastase with saccharine and starchy substances, substantially as herein described.

3. A candy consisting in whole or part of cane-sugar cemented into a mass by means of malt or malt extract, substantially as and for the purpose set forth.

4. As an article of manufacture, a malt candy in the form of a lozenge or other solid substance, substantially as described.

ISAAC W. HEYSINGER.

Witnesses:
P. O'DONNELL,
C. T. QUIN.